A. B. CLARK.
OSCILLATING VALVE.

No. 174,197. Patented Feb. 29, 1876.

Witnesses:
Henry Eichling
B. S. Clark

Inventor:
Ambrose B. Clark
By Fitch & Fitch
His Attys.

N. PETERS, PHOTO-LITHOGRAPHER, WASHINGTON, D. C.

UNITED STATES PATENT OFFICE.

AMBROSE B. CLARK, OF MYSTIC RIVER, CONNECTICUT.

IMPROVEMENT IN OSCILLATING VALVES.

Specification forming part of Letters Patent No. 174,197, dated February 29, 1876; application filed January 25, 1876.

*To all whom it may concern:*

Be it known that I, AMBROSE B. CLARK, of Mystic River, county of New London and State of Connecticut, have invented a new and Improved Valve for Oscillating Engines, of which the following is a full, clear, and exact description, reference being had to the accompanying drawings, forming part of this specification.

My invention relates to a valve for that class of engines in which the cylinders oscillate; and it consists in cylindrical valve-box, arranged upon the top of the oscillating cylinder, and having a cylindrical valve within it, the valve having the ports hereinafter described, and being operated by a rod fixed to the axis of the valve, and provided with a pin, which is adjusted in a slot in a suitable frame or standard, whereby the oscillation of the cylinder will operate the valve placed upon it, as herein particularly set forth.

Figure 1:
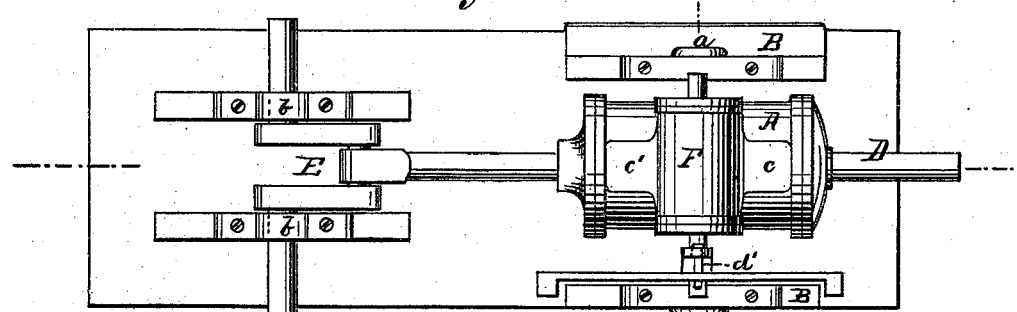
Figure 2:
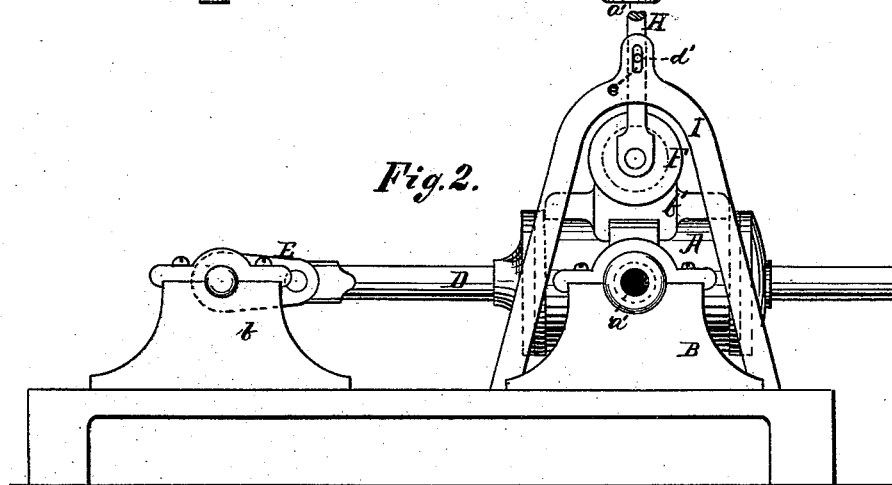
Figure 5:
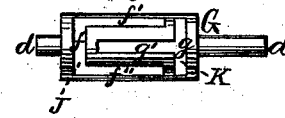
Figure 3:
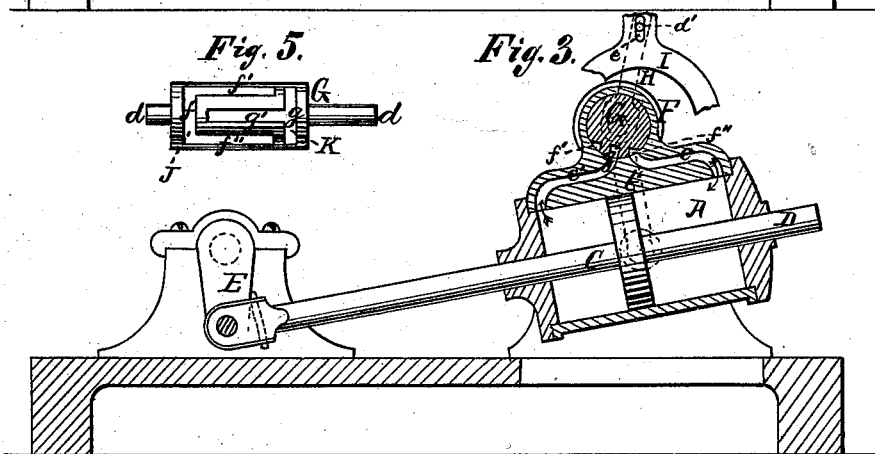

Figure 1 is a plan of my invention. Fig. 2 is a side elevation. Fig. 3 is a longitudinal section; and Fig. 4 is a vertical cross-section of the same; and Fig. 5 is a view in detail of the cylindrical valve.

A is the cylinder, which is mounted on a transverse axis, having bearings in suitable standards B, as shown. This axis of the cylinder is composed of the steam eduction and exhaust ports $a$ and $a'$, which are extended upward around the cylinder to the valve-box, as seen in Fig. 4. C is the piston. D is the piston-rod. E is the crank, mounted in bearings at $b$. F is the valve-box, which is mounted upon the cylinder, and so arranged that its vertical diameter is in a line with the vertical diameter of the bearings $a$ and $a'$ of the cylinder. This valve-box is cylindrical in form, and is placed crosswise of the cylinder—that is, with its axis at right angles to the axis of the cylinder. This valve-box has a base or port piece, $b'$, which interposes between it and the cylinder, and is preferably in the same piece with the box, and into and through it open the ports $a$ and $a'$, while the ports $c$ and $c'$, which open from the valve-box into either end of the cylinder, are also formed in said piece $b'$. Within the valve-box is arranged the cylindrical valve G, which is mounted upon an axis, $d$, having bearings in the box-heads. Upon one end of this axis $d$, which is preferably in one piece with the valve, is fixed a rod, H, having a pin, $d'$, fixed in it, and arranged to engage in a slot, $e$, in a frame-piece, I.

The cylindrical valve G is formed with two ports, grooved or channeled into its face. An eduction-port, J, is formed by the channel $f$ running near one end of the valve, and at right angles to its axis, and the channels $f'$ and $f''$ communicating with channel $f$, and extending from the ends of channel $f$, in line with the valve's axis, nearly to the other end of the valve. An exhaust-port, K, is formed of the channel $g$ near the end opposite to channel $f$, and extending at right angles to the valve's axis, and the channel $g'$ communicating with channel $g$ at the center thereof, and extending along the surface of the valve, between the channels $f'$ and $f''$ of the eduction-port, nearly to the opposite end of the valve. This form of the ports J and K is plainly shown in Fig. 5.

Figure 4:
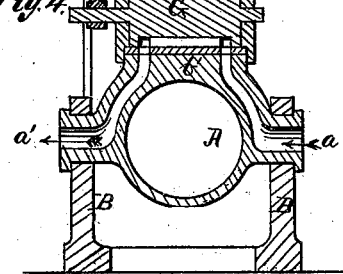

In adjusting the valve in its box the channel $f$ of the eduction-port is placed over the opening of the eduction-pipe $a$, and the channel $g$ of the exhaust-port is placed over the opening of the exhaust-pipe $a'$, as seen in Fig. 4. The dimensions of these ports should correspond with the dimensions of said openings. The channels $f'$, $g'$, and $f''$ should be so arranged that the distance between them, respectively, should be the same as the distance between the mouths of the ports $c$ and $c'$ when they open into the valve-box.

Now it is evident that, by means of the rod H, having the pin $d'$ engaged in the slot $e$, in frame I, when the cylinder is in the position shown in Fig. 3, the crank E being down at its lowest limit, that the channel $f'$ of the eduction-port J will be opposite to, and communicate with, the port $c$ leading into the cylinder upon one side of the piston, while the channel $g'$ of the exhaust-port K will be opposite to, and communicate with, the port $c'$. When the cylinder has oscillated to the reverse position, and the crank is at its highest limit, the channel $f''$ of the eduction-port will communicate with the port $c'$, and the channel $g'$ of the exhaust-port will communicate with the port $c$. Thus, by the oscillation of the cylinder, communication is alternately opened between the port c and eduction-tube a and port c' and exhaust-tube a' simultaneously, and the port c and exhaust-tube a' and port c' and eduction-tube a simultaneously.

Any other suitable device than the frame-piece I may be employed. But the pin $d'$, which pivots the vibrating-rod H, should work in a slotted bearing, so as to accommodate the rod to the oscillatory motion of the cylinder.

What I claim as my invention, and desire to secure by Letters Patent, is—

The combination with the oscillating cylinder A of the valve-box F, having eduction-port a and exhaust-port a' and ports c and c', and the cylindrical valve G, having eduction-port J formed of channels $f$, $f'$, and $f''$, and exhaust-port K formed of channels $g$ and $g'$, together with rod H, and its pin $d'$ and the slot e, when constructed and arranged as described, to operate as specified.

AMBROSE B. CLARK.

Witnesses:
PAUL A. NOYES,
LEMUEL CLIFT.